(12) United States Patent
Nougayrede et al.

(10) Patent No.: US 9,005,566 B2
(45) Date of Patent: Apr. 14, 2015

(54) STAGED COMBUSTION OF SULFUREOUS COMBUSTIBLE EFFLUENTS WITH RECOVERY OF THE SULFUR IN THE CLAUS PROCESS

(75) Inventors: Jean Nougayrede, Pau (FR); Soufiene Maktouf, Abu Dhabi (AE)

(73) Assignee: Total SA, Courbevoie (FR)

( * ) Notice: Subject to any disclaimer, the term of this patent is extended or adjusted under 35 U.S.C. 154(b) by 0 days.

(21) Appl. No.: 14/240,839

(22) PCT Filed: Aug. 22, 2012

(86) PCT No.: PCT/FR2012/051919
§ 371 (c)(1),
(2), (4) Date: Feb. 25, 2014

(87) PCT Pub. No.: WO2013/030494
PCT Pub. Date: Mar. 7, 2013

(65) Prior Publication Data
US 2014/0208998 A1    Jul. 31, 2014

(30) Foreign Application Priority Data

Aug. 26, 2011 (FR) .................................... 11 57577

(51) Int. Cl.
| | | |
|---|---|---|
| *B01D 53/48* | (2006.01) | |
| *C01B 17/04* | (2006.01) | |
| *C10L 3/10* | (2006.01) | |
| *F23G 7/06* | (2006.01) | |
| *B01D 53/34* | (2006.01) | |
| *B01D 53/52* | (2006.01) | |
| *F23G 7/07* | (2006.01) | |

(52) U.S. Cl.
CPC .......... *C01B 17/0417* (2013.01); *B01D 53/346* (2013.01); *B01D 53/48* (2013.01); *B01D 53/52* (2013.01); *C01B 17/0421* (2013.01); *B01D 2251/102* (2013.01); *B01D 2251/11* (2013.01); *B01D 2251/20* (2013.01); *B01D 2257/30* (2013.01); *B01D 2257/302* (2013.01); *B01D 2257/304* (2013.01); *B01D 2257/306* (2013.01); *B01D 2257/308* (2013.01); *B01D 2259/122* (2013.01); *C01B 17/043* (2013.01); *F23G 7/07* (2013.01)

(58) Field of Classification Search
USPC ........ 423/571, 573.1, 576.8; 48/127.3, 127.5, 48/127.7
See application file for complete search history.

(56) References Cited

U.S. PATENT DOCUMENTS

| | | | |
|---|---|---|---|
| 5,139,765 A | 8/1992 | Szekely | |
| 5,508,013 A | 4/1996 | Kvasnikoff et al. | |
| 2006/0057056 A1* | 3/2006 | Chretien | .................... 423/573.1 |
| 2008/0247927 A1 | 10/2008 | Rameshini | |

FOREIGN PATENT DOCUMENTS

| | | |
|---|---|---|
| GB | 2 187 444 | 9/1987 |
| GB | 2 187 445 | 9/1987 |

* cited by examiner

*Primary Examiner* — Timothy Vanoy
(74) *Attorney, Agent, or Firm* — Clark & Brody

(57) ABSTRACT

A process for advantageously efficiently treating a sulfureous combustible effluent stream by recovering the sulfur in elemental form comprises a step of combustion of the sulfureous combustible effluent stream with an oxidant gas in excess, and then a step of post-combustion of the effluents from the combustion step with an acidic gas. The stream of the post-combustion effluents, free of chemical compounds that are harmful to the efficacy of the Claus catalysts, is treated in a Claus unit, which performs the recovery of the sulfur in elemental form.

10 Claims, 4 Drawing Sheets

STAGED COMBUSTION OF SULFUREOUS COMBUSTIBLE EFFLUENTS WITH RECOVERY OF THE SULFUR IN THE CLAUS PROCESS

TECHNICAL FIELD OF THE INVENTION

The present invention belongs to the field of oil exploration and production. It concerns a process for treating sulfureous combustible effluents.

PRIOR ART

The management of acidic gases is a recurrent problem in the field of oil and gas production. Acidic gases are gases that are rich in hydrogen sulfide ($H_2S$) and/or in carbon dioxide ($CO_2$) and/or other sulfureous compounds. These gases, which are usually associated with liquid or gaseous natural hydrocarbons, are obtained by desulfurization of these hydrocarbons in oil refineries and natural gas factories. This acidic gas extraction treatment is imperative in order to make the hydrocarbons clean for consumption as combustibles (spirits, fuels, domestic and industrial gases, etc.).

The presence of $H_2S$ in hydrocarbon gases causes corrosion of the materials that constitute the petroleum product recovery and storage units. It is thus necessary to use materials that are sufficiently resistant and very expensive.

$H_2S$ emissions also raise environmental problems and health problems for the persons present on the oil extraction sites, since it is a lethal toxic product. The amount of $H_2S$ released into the atmosphere is limited by norms. If the oil well generates more acidic gases than is permitted by the norms, it is necessary to install scavenging and/or treatment units at the top of the extraction wells.

One known technical solution for treating acidic gases is the Claus process. The Claus process makes it possible to recover sulphur in elemental form S from an effluent containing $H_2S$ via the following overall chemical reaction:

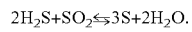

A standard Claus unit is represented schematically in FIG. 1. The Claus unit 1 comprises, firstly, an oven 2, known as the reaction oven, and, secondly, a series of catalytic reactors 3 and 4. A stream of acidic gas 6, typically $H_2S$ and $CO_2$, and a stream of oxidant gas 7, typically a gas containing oxygen $O_2$, such as air, are injected into the inlet of the oven 2. The first step of the Claus process, known as the "thermal" step in which part of the $H_2S$ is burnt off with the oxygen, takes place in the oven according to the reaction:

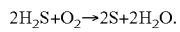

This combustion reaction is highly exothermic and the temperature of the gases derived from this combustion is typically between 1000° C. and 1200° C. The gases may be cooled by indirect heat exchange with water, typically in a heat recovery boiler 8. The effluent may then be cooled more substantially in a condenser 9 in which part of the sulfur formed in the oven 2, in elemental form S, is condensed and may be evacuated via the pipe 10. Specifically, on account of the high temperature inside the oven 2, some of the sulfureous compounds react according to the Claus reaction to form sulfur. However, the reaction therein is thermo-dynamically limited, and the maximum conversion yield is about 60-70%.

The gaseous stream derived from the condenser 9 is conveyed into the series of catalytic reactors 3 and 4. The second step of the Claus process, known as the "Claus catalytic" step, takes place in each of these reactors. $H_2S$ and $SO_2$ react together at moderate temperatures, typically 200 to 300° C., according to the Claus reaction:

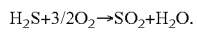

Condensers 11 and 12 are arranged, respectively, after the reactors 3 and 4, so as to cool the effluents and to condense the sulfur in elemental form S after passage through each reactor. The sulfur is recovered via the pipes 13 and 14.

Claus processes are described, for example, in documents GB 2 187 444 and U.S. Pat. No. 5,139,765.

Besides the presence of $H_2S$, the presence of other sulfureous compounds, for instance mercaptans, in the hydrocarbon gases may be detrimental to their exploitation. Processes exist for treating these gases, which are generally directed towards removing all the sulfureous compounds.

Thus, mention may be made of the treatment processes leading to the production of sulfureous combustible effluents of "hydrocarbon-polluted sulfur" type, which consist in washing hypersulfureous gas wells using a hydrocarbon-based physical solvent in order to remove the deposits of native sulfur in the production installations (wells, separators, etc.). Mention will be made especially of the DSR® (Downhole Sulfur Recovery) process, which consists in washing the wells with a physical solvent of naphthalenic polyaromatic hydrocarbon-based type, the regeneration of which results in the production of polluted sulfur containing naphthalenic residues. The sulfureous effluents separated from the crude gas contain sulfur in elemental form, but also a non-negligible residual amount of solvent, which makes these effluents unsuitable for commercialization.

Mention may also be made of the processes of MEROX type (acronym of "mercaptan oxidation") which make it possible to remove mercaptans from condensates of natural gases such as LPG. These processes result in the conversion of mercaptans into disulfide compounds. The effluents produced containing these disulfide compounds, which are commonly known as DSO (Di-Sulfide Oil), are in certain cases removed by incineration, which may create problems of expulsion of sulfureous compounds into the atmosphere.

It would be advantageous to be able to treat sulfureous combustible effluents, such as DSOs or the DSR® effluents, in order to recover the sulfur in elemental form. Such a treatment, which is environmentally more efficient than incineration, might also make it possible to economically upgrade the sulfur thus recovered in commercializable form.

It has been envisaged to treat the said effluents by combustion, so as to convert the sulfur into $SO_2$, and then to treat the combustion effluent in order to recover the sulfur from the $SO_2$ in a Claus unit. Combustion also makes it possible to transform all of the hydrocarbon compounds into $CO_2$ and $H_2O$. However, combustion is accompanied by the concomitant formation of oxidized chemical compounds, especially $SO_3$ and $NO_x$. The presence of these two compounds in the combustion gases, and also the excess oxygen, renders the direct treatment of these effluents over Claus catalysts difficult. It has been found that these compounds may bring about sulfatation of the catalysts, which rapidly lose their activity. It is thus advantageous to remove compounds such as $SO_3$, $NO_x$ and $O_2$ before injection of the effluent of the treatment in the Claus process.

International patent application WO 92/19532, which belongs to the same family as patent application U.S. Pat. No. 5,508,013, describes a process for treating a combustible effluent, which may optionally contain sulfureous compounds that are oxidizable to $SO_2$, with a thermal reaction stage and a Claus catalytic stage, the thermal reaction stage being divided into two zones: a first zone in which combustion of the combustible effluent with an excess of air is performed, and a second zone in which an acidic gas is partially burned according to the standard Claus method, the combustion effluents from the first zone being introduced into the second zone after having been mixed with another stream of acidic gas. This prior art document moreover describes the possibility of injecting an acidic gas into the first combustion zone. However, this injection is performed directly in the combustion chamber, close to the outlet of this chamber, and the said document does not describe or suggest a post-combustion reaction step, in a dedicated reaction chamber. The inventors have found that this process did not make it possible to solve the problems of the prior art: the excess of oxygen and the presence especially of $SO_3$ and $NO_x$ in the effluent derived from the first zone prove to be detrimental to the correct functioning of the Claus unit on account of the problems of corrosion of the installations and of the poisoning of the catalysts. Reduction of the nitrogen oxides and of the $SO_3$ in the second combustion zone, as described in this prior art document, does not make it possible to solve the posed problem, which is that of protecting this zone from the corrosive effects of these compounds.

There is currently still a need for a process for treating sulfureous combustible effluents that does not have the drawbacks of the prior art, and that is advantageously compatible with a Claus process.

SUMMARY OF THE INVENTION

The inventors have developed a two-step process that makes it possible to advantageously treat a stream of sulfureous combustible effluents, the said process making it possible at least partly to recover the sulfur in elemental form. The treated stream does not substantially contain any chemical compounds that are harmful to the Claus catalytic reactors. This process consists especially of the succession of two steps: a combustion step and a post-combustion step.

The subject of the present invention is a process for treating a stream of sulfureous combustible effluents, comprising the successive steps consisting in:
  introducing into a combustion chamber the said stream and an oxidant gas in excess, performing the total combustion of the said stream with an excess of the oxidant gas, and withdrawing the gaseous effluent from the combustion chamber;
  introducing into a post-combustion chamber the said gaseous effluent as a mixture with an acidic gas, the said acidic gas being in an amount sufficient for all of the oxidant compounds to be consumed by reaction with the hydrogen sulfide of the acidic gas, and removing the treated stream, the residence time of all the gaseous streams inside the said post-combustion chamber being at least greater than 0.5 second.

DETAILED DESCRIPTION

Figure 1:
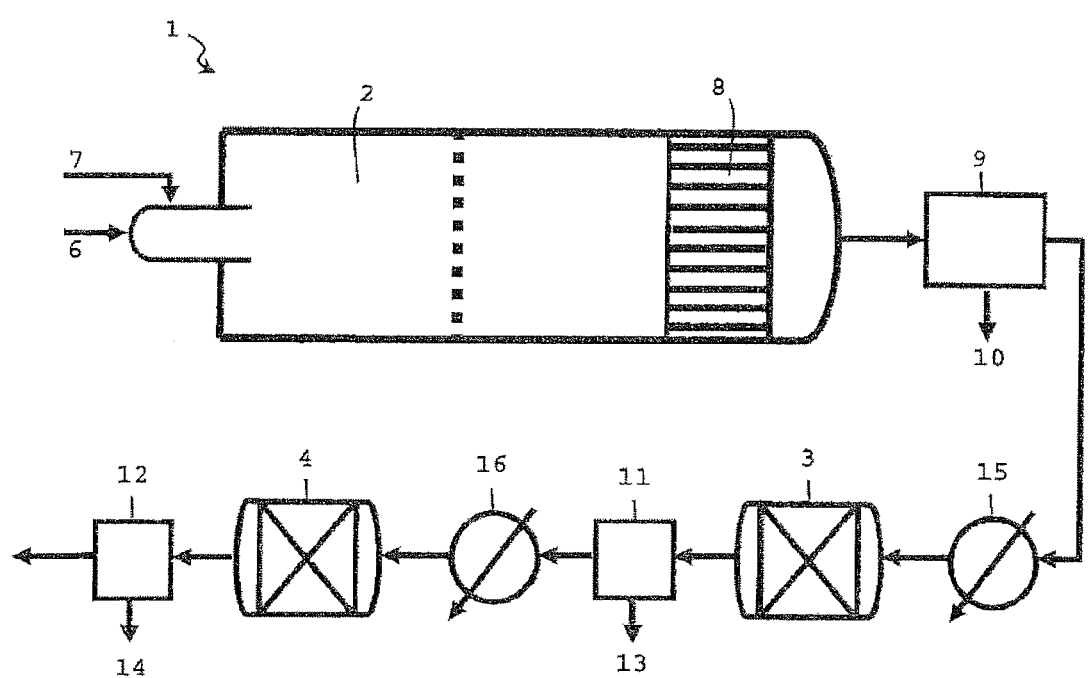
FIG. 1 schematically represents a standard Claus unit with 2 catalytic reactors as known in the prior art.

Unless specifically mentioned otherwise, the expression "percent (%) by weight of sulfur" denotes the percentage represented by the element sulfur, irrespective of its chemical form, by weight, relative to the total weight considered.

The process that is the subject of the present invention has the function of treating a sulfureous combustible effluent stream. The said stream may be gaseous or liquid. It contains hydrocarbons capable of undergoing combustion. The sulfur may be in any chemical form, for example in the form of elemental sulfur S or in the combined form in chemical compounds such as hydrogen sulfide, mercaptans, organic sulfides, organic disulfides, sulfoxides and sulfones. Advantageously, the said sulfureous combustible effluent stream contains between 1% and 99.5% by weight of sulfur. If it is a combustible effluent stream polluted with sulfur, the sulfur concentration may be between 1% and 25%. If it is a stream of sulfur polluted with a combustible effluent, the sulfur concentration may be between 95% and 99.5%.

According to one embodiment, the sulfureous combustible effluent stream treated in the process according to the invention is a stream of sulfur polluted with combustible impurities. Such a stream may be derived from a process of DSR® type. A DSR® process effluent typically contains between 95% and 99.5% by weight of sulfur, in elemental form S. The rest of the effluent generally consists of heavy hydrocarbons of the aromatic and polyaromatic type.

According to another embodiment, the sulfureous combustible effluent stream treated in the process according to the invention is a DSO. DSO consists essentially of disulfide organic compounds. The term "disulfide organic compounds" denotes in the present invention compounds of general formula R—S—S—R', in which R and R' are identical or different and represent, independently of each other, a hydrocarbon-based radical. Among the disulfide chemical compounds, mention may be made of DMDS (dimethyl disulfide), DEDS (diethyl disulfide), DPDS (dipropyl disulfide) and DBDS (dibutyl disulfide), and more generally dialkyl disulfides and diaryl disulfides. DSO preferably contains between 20% and 55% by weight of sulfur.

In a first step, the sulfureous combustible effluent stream is introduced into a combustion chamber with an excess of an oxidant gas. The oxidant gas is any gas containing oxygen $O_2$. Preferably, the oxidant gas is air. However, without departing from the scope of the present invention, the oxidant gas may be pure oxygen, oxygen-enriched air, or mixtures in all proportions of oxygen and of one or more inert gases.

The injection of the sulfureous combustible effluent stream and of the oxidant gas into the combustion chamber may be performed according to any method known to those skilled in the art. It is possible to introduce into the combustion chamber a stream of water vapour at the same time as the sulfureous combustible effluent stream and the oxidant gas. Preferably, the combustion chamber is equipped with a burner, means for bringing the sulfureous combustible effluent stream and the oxidant gas to the said burner, preferably with adjustable flow rates making it possible to appropriately control the oxidant gas/combustible ratio and the resulting excess of oxygen in the combustion effluent. The sulfureous combustible effluent stream and the oxidant gas may, independently of each other, be preheated before being fed to the burner.

The sulfureous combustible effluent stream is injected into the combustion chamber at a temperature preferably of between 20° C. and 150° C., more preferably between 30° C. and 80° C. and even more preferably between 40° C. and 60° C.

The oxidant gas is injected into the combustion chamber at a temperature preferably of between 20° C. and 250° C., more preferably between 40° C. and 200° C. and even more preferably between 80° C. and 120° C.

The temperature of the combustion reaction is limited by the limit temperature that may be tolerated by the construction materials of the oven, consisting essentially of refractory materials. Typically, with a standard combustion chamber, the maximum combustion temperature tolerated is 1450-1500° C. Advantageously, the temperature of the combustion reaction in the process that is the subject of the present invention is as high as possible, i.e. approximately equal to the maximum temperature tolerated by the construction materials of the combustion chamber. The combustion reaction temperature is preferably between 1300° C. and 1500° C., more preferably between 1350° C. and 1450° C. and even more preferably between 1400° C. and 1450° C.

The temperature of the highly exothermic combustion may be controlled according to the methods known to those skilled in the art. One economically advantageous method may consist in injecting a stream of air into the combustion chamber. The oxygen contained in this regulating air stream adds to the excess oxidant gas in the combustion chamber. Without departing from the scope of the present invention, the regulation of the temperature in the combustion chamber may be performed according to any means known to those skilled in the art, for example by injection of a gaseous stream that is inert with respect to the combustion reaction. Another means for controlling the temperature may consist in cooling the wall of the combustion oven by indirect heat exchange with an external heat-exchange fluid, such as a circulation of water placed in contact with the oven wall.

The pressure inside the combustion chamber is advantageously chosen so as to allow the effluents of the treatment process to be injected into a Claus unit. This pressure may be between 0.2 and 1.5 bar, more preferably between 0.3 and 1.0 bar and even more preferably between 0.4 and 0.7 bar.

The relative amounts of sulfureous combustible effluent streams and of oxidant gas are adjusted relative to each other so that the oxidant gas is in excess relative to the need corresponding to the stoichiometric combustion of the sulfureous combustible effluent. The excess $O_2$ in the effluent entering the post-combustion chamber is advantageously greater than 0.5 vol %, preferably between 1.0 vol % and 3.0 vol % and even more preferably between 1.5 vol % and 2.5 vol %. The presence of this excess of oxidant gas makes it possible to ensure full combustion of the hydrocarbons and of the sulfur in the combustion chamber. For the purposes of the present invention, the term "full combustion" means a combustion characterized in that the combustion effluent contains less than 500 ppmv of residual hydrocarbons. The hydrocarbon-based material is predominantly transformed into $CO_2$ and $H_2O$, while the sulfur is predominantly transformed into $SO_2$. The gaseous effluent withdrawn from the combustion chamber consists predominantly of $CO_2$, $H_2O$, $SO_2$ and $O_2$. It may contain other compounds, in particular residues of hydrocarbon-based compounds, compounds of $NO_x$ and $SO_2$ type. $SO_2$ is the result of the chemical equilibrium $SO_2+\frac{1}{2}O_2=SO_2$ under the combustion reaction conditions. The $NO_x$ formed are of "thermal" origin associated with the high temperatures used in the combustion step.

According to one embodiment, the combustion chamber is equipped with means for homogenizing the combustion effluent streams. These means are standard and well known to those skilled in the art. Such means may preferably be an alveolar wall constructed of refractory materials, arranged inside the combustion chamber.

In a second step, the said gaseous effluent is introduced into a post-combustion chamber with an acidic gas. For the purposes of the present invention, the term "acidic gas" means a gas containing at least 5% by volume of $H_2S$. The said acidic gas preferably contains between 15% and 100% by volume of $H_2S$, more preferably between 20% and 100% by volume of $H_2S$ and even more preferably between 30% and 100% by volume of $H_2S$. The said acidic gas may also contain $CO_2$, preferably between 0 and 85% by volume of $CO_2$, more preferably between 0 and 80% by volume of $CO_2$ and even more preferably between 0 and 70% by volume of $CO_2$. According to one embodiment, the acidic gas introduced into the post-combustion chamber is a gas consisting to at least 95% of a mixture of $H_2S$ and $CO_2$.

The injection of the acidic gas and of the effluent from the combustion chamber into the post-combustion chamber may be performed according to any method known to those skilled in the art. Preferably, the post-combustion chamber is equipped with an inlet orifice for the effluent from the combustion chamber and with a means for injecting the acidic gas into the said orifice. An injection means is described, for example, in international patent application WO 92/19532.

The acidic gas reacts in the post-combustion chamber with the gaseous effluent from the combustion chamber. The post-combustion reactions between the acidic gas and the gaseous effluent are reduction reactions, which are proportionately more favoured the higher the temperature. Since the post-combustion reaction temperature results especially from the temperature of the combustion effluents, it is advantageous to work with combustion effluents at the highest possible temperature. In addition, the acidic gas may be preheated before being injected into the post-combustion chamber.

However, without departing from the scope of the present invention, the temperature of the post-combustion reactions may be regulated by any means known to those skilled in the art, for example by heating or cooling the chamber by heat transfer across the wall of the said chamber, or by heating or cooling the gaseous effluent withdrawn from the combustion chamber and optionally the acidic gas.

The temperature of the post-combustion reactions is preferably between 1100° C. and 1450° C., more preferably between 1150° C. and 1400° C. and even more preferably between 1200° C. and 1350° C.

The pressure inside the post-combustion chamber may be between 0.15 and 1.45 bar, more preferably between 0.25 and 0.95 bar and even more preferably between 0.35 and 0.65 bar.

The second step of the process that is the subject of the present invention is characterized in that the gaseous streams are introduced into a post-combustion chamber and that the residence time of all the gaseous streams in the said post-combustion chamber is at least greater than 0.5 second. This residence time may advantageously be between 0.5 and 10 seconds, more preferably between 0.7 and 2.5 seconds and even more preferably between 1.0 and 2.0 seconds. The inventors have established that a minimum residence time of 0.5 second is necessary in order for the post-combustion reactions to take place. The post-combustion chamber is sized to comply with this residence time, as a function of the flow rate of reagents in the process. The presence of a post-combustion step, in a post-combustion chamber in which the reagent gases have a minimum residence time of 0.5 second, advantageously makes it possible to solve one of the problems observed in the prior art, which is the corrosion and poisoning of the catalysts of the downstream installations, in particular of the Claus unit, especially by the compounds $SO_3$ and $NO_x$. In the present application, the residence time is given at standard temperature and pressure conditions (abbreviated to STP), i.e. a temperature of 0° C. and a pressure of 1 atm.

According to one advantageous embodiment, the post-combustion chamber is equipped with means for homogenizing the streams. These means are standard and well known to those skilled in the art. Such means may preferably be an alveolar wall made of refractory materials, arranged inside the post-combustion chamber.

The placing in contact of the acidic gas with the combustion effluent allows, inter alia:
the consumption of the $O_2$ present in the effluent,
the reduction of the residues of hydrocarbon-based compounds, of $SO_2$ and of compounds of $SO_3$ and $NO_x$ type.

The relative amounts of the effluent and of the acidic gas are adjusted relative to each other so that all of the oxidant compounds are consumed by reaction with the $H_2S$ of the acidic gas. The term "oxidant compounds" means herein $O_2$, $SO_3$ and $NO_x$. Thus, the treated stream withdrawn from the post-combustion chamber has an $O_2$ content of less than 500 ppmv, preferably less than 100 ppmv and even more preferably less than 50 ppmv. In addition, the treated stream withdrawn from the post-combustion chamber advantageously has an $SO_3$ content of less than 200 ppmv, preferably less than 100 ppmv and more preferably less than 50 ppmv. Advantageously, the treated stream withdrawn from the post-combustion chamber has an $NO_x$ content of less than 100 ppmv, preferably less than 70 ppmv and more preferably less than 50 ppmv.

Since an object of this second step is to consume the oxygen present in the effluent from the first step, it is implicit that no oxidant gas should be introduced into the post-combustion chamber with the gaseous effluent and the acidic gas. In particular, in the second step of the process according to the invention, no stream of air, of pure oxygen or of oxygen-enriched air is introduced into the post-combustion chamber. In other words, the second step of the reaction according to the invention consists in reacting a mixture consisting of the gaseous effluent from the combustion chamber and an acidic gas.

The process for treating a sulfureous combustible effluent stream may also comprise a step consisting in cooling the treated stream withdrawn from the post-combustion chamber. The cooling may be performed by indirect heat exchange with any stream, preferably water. According to one preferred embodiment, the said treated stream is cooled by indirect heat exchange with water in a heat recovery boiler for producing steam. The treated stream may be cooled to a temperature preferably of between 250° C. and 350° C., more preferably between 280° C. and 330° C. and even more preferably between 290° C. and 320° C.

The treated stream withdrawn from the post-combustion chamber may contain elemental sulfur S in vapour form, obtained from the Claus reaction which takes place under the effect of the high temperature in the post-combustion chamber. The process for treating a sulfureous combustible effluent stream according to the present invention may also comprise a step consisting in removing the sulfur in elemental form from the final stream withdrawn from the post-combustion chamber. To do this, the treated stream may be cooled in a condenser. On exiting this condenser, liquid sulfur in elemental form S is recovered, on the one hand, and a partially desulfurized effluent is recovered, on the other hand. Preferably, the optional step of removal of the sulfur in elemental form is performed after having performed the optional step of cooling of the treated stream withdrawn from the post-combustion chamber.

The treated stream obtained via the process that is the subject of the present invention, optionally cooled and/or optionally partially desulfurized, may advantageously be treated in a Claus process.

According to a first embodiment, the process for treating a sulfureous combustible effluent stream, which is the subject of the present invention, also comprises a step that consists in introducing the treated stream withdrawn from the post-combustion chamber, optionally cooled and/or optionally partially desulfurized, into the reaction oven of a Claus unit, in addition to a charge of acidic gas and of oxidant gas feeding the burner of the Claus reaction oven.

Preferably, the molar flow rate of sulfur contained in the sulfureous combustible effluent stream to be treated is not more than 50%, more preferably between 3% and 30% and even more preferably between 5% and 10% of the molar flow rate of the sulfur contained in $H_2S$ form in all of the acidic gases used in the post-combustion chamber and in the burner of the Claus reaction oven.

The Claus process is preferably performed according to the techniques that are well known to those skilled in the art. According to this embodiment, the flow rates of the treated stream introduced into the reaction oven of the Claus unit and of the total stream consisting of the charge of acidic gas and of oxidant gas are adjusted relative to each other so that, preferably, the effluent from the thermal step of the Claus reaction has an $H_2S/SO_2$ mole ratio of about 2.

This first embodiment is particularly suited to the case where the molar flow rate of the initial sulfureous combustible effluent stream to be treated contains not more than 50 t/day of sulfur, more preferably not more than 30 t/day of sulfur and even more preferably not more than 10 t/day of sulfur. In addition, this first embodiment is particularly suited to the case where a Claus unit is moreover used, the process that is the subject of the present invention then making it possible to treat and to upgrade the sulfureous combustible effluent stream, in a simple and economical manner, directly and without complex adjustment in the said Claus unit.

According to a second embodiment, the process for treating a sulfureous combustible effluent stream that is the subject of the present invention also comprises a step that consists in introducing the treated stream withdrawn from the post-combustion chamber, optionally cooled and/or optionally partially desulfurized, into one or a series of several Claus catalytic reactors.

This step of the Claus process is preferably performed according to the techniques that are well known to those skilled in the art. In particular, the catalysts present in the reactors are typically those known to those skilled in the art for catalysing the Claus reaction and associated reactions such as hydrolysis reactions of the compounds COS and $CS_2$ formed in the reaction oven. Among these catalysts, mention may be made of: bauxites, activated aluminas, titanium oxides and derived catalysts obtained by impregnation of an active compound.

Advantageously, the treated stream withdrawn from the post-combustion chamber, optionally cooled and/or optionally partially desulfurized, comprises the compounds $H_2S$ and $SO_2$ in an $H_2S/SO_2$ mole ratio preferably of between 1.0 and 3.0, more preferably between 1.5 and 2.5 and even more preferably between 1.9 and 2.1. Compliance with this ratio advantageously makes it possible to optimize the yields for the catalytic steps of the Claus unit. The control of the mole ratio is preferably exerted according to the means known to those skilled in the art, which consist mainly in regulating the flow rates of the streams entering the combustion and post-combustion chambers.

When a series of several reactors is used, condensers may be arranged after the said reactors, so as to condense the sulfur in elemental form S produced at the outlet of each reactor. Heat exchangers may also be arranged at the inlet of the reactors to heat the streams entering the reactors. It is thus possible to optimize the overall functioning of the Claus unit in order to obtain a maximum yield of sulfur recovery.

The amount of sulfur remaining in the residual gases after the catalytic steps of the Claus unit is preferably less than 70, more preferably less than 5% and even more preferably less than 0.1% of the total sulfur charge introduced in the form of acidic gas and of sulfur contained in the sulfureous combustible effluent.

This second embodiment is particularly suited to the case where the molar flow rate of the initial sulfureous combustible effluent stream to be treated contains more than 15 t/day of sulfur, more preferably between 25 and 50 t/day of sulfur and even more preferably between 30 and 40 t/day of sulfur. This second embodiment makes it possible advantageously to have a unit dedicated solely to the treatment of the sulfureous combustible effluent stream. This dedicated unit has the advantage of being autonomous and enables the recovery from a combustible effluent stream of the sulfur in an economically upgradeable form, with control of the atmospheric discharges of $SO_2$. This second embodiment is possible due to the fact that the treated stream according to the process that is the subject of the present invention advantageously substantially contains no chemical compounds that are harmful to the Claus catalysts and installations.

The process that is the subject of the present invention may also comprise an additional step that consists in recycling into the combustion chamber at least part of a process stream substantially not containing any oxygen, the temperature of which is less than 300° C. and preferably less than 160° C. For the purposes of the present invention, the term "substantially not containing any oxygen" means an $O_2$ content of less than 500 ppmv, more preferably less than 100 ppmv and even more preferably less than 50 ppmv.

The recycling may be performed by means of the standard techniques known to those skilled in the art, for example using a blower, or using a steam ejector.

The said process stream is intended to cool the combustion effluent and thus to limit the excess air required to keep the combustion temperature below the admissible temperature for the strength of the construction materials (1450-1500° C.). This recycling process stream may be chosen from:
   the cooled treated stream withdrawn from the post-combustion chamber, obtained after a cooling step,
   the cooled and Partially desulfurized treated stream, obtained after a cooling step and a step of condensation of the sulfur in elemental form,
   if the treated stream withdrawn from the post-combustion chamber, optionally cooled and/or optionally partially desulfurized, is introduced into one or a series of several Claus catalytic reactors, then a stream withdrawn at any level in the catalytic part of this process.

Preferably, the stream at least partly recycled into the combustion chamber is the partially desulfurized, cooled treated stream, obtained after a step of condensation of the sulfur formed in the post-combustion step.

The injection of the said recycled stream into the combustion chamber advantageously makes it possible to regulate the temperature of the combustion reaction, without increasing the excess of oxygen in the combustion chamber, as is the case when the heat regulation is performed with additional air, and without increasing the cost of the process as is the case when the heat regulation is performed with an inert gas.

Other characteristics and advantages of the invention will emerge from the embodiments described below.

DETAILED DESCRIPTION OF THE FIGURES

Figure 2:
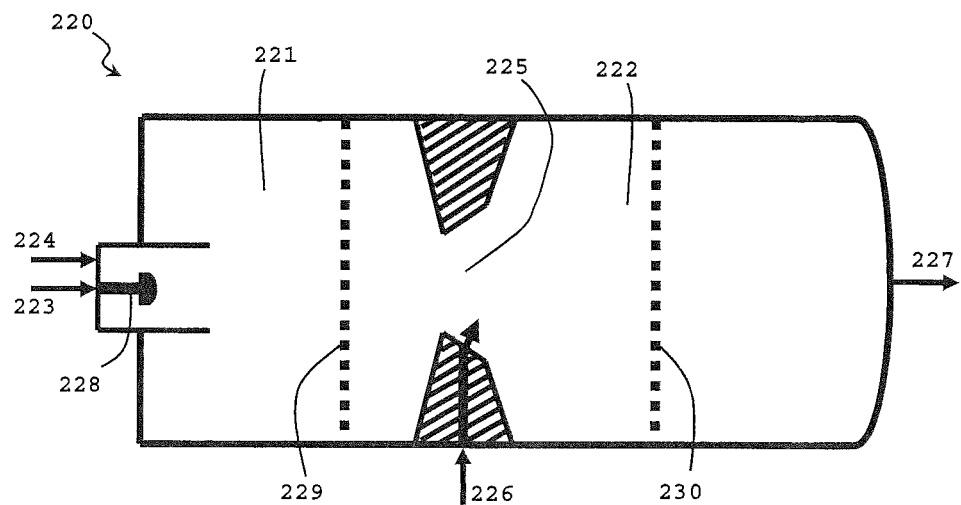
FIG. 2 represents a unit for treating a sulfureous combustible effluent stream which allows the process that is the subject of the present invention to be performed.
Figure 3:
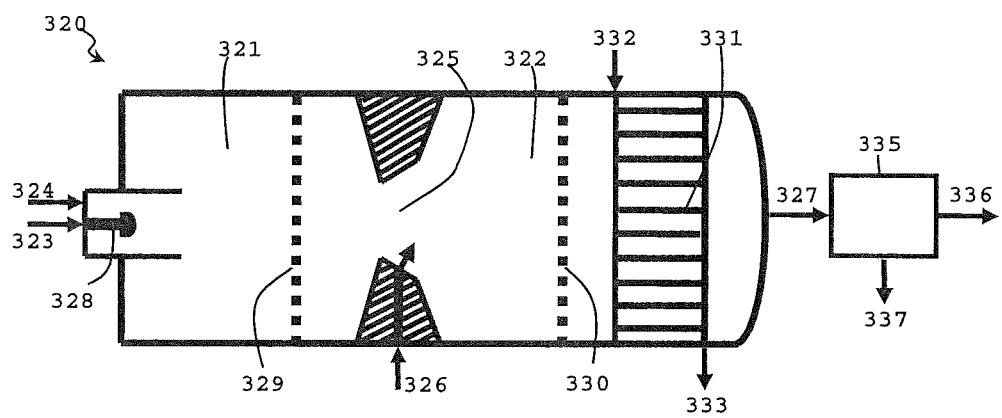
FIG. 3 represents a variant of the unit represented in FIG. 2.

The numbering of FIGS. 2 to 6 is performed in the form AXY in which A is the number of the figure and XY is the number of the equipment, for example 2XY for FIG. 2 or 3XY for FIG. 3. The figures X and Y are identical for the same equipment irrespective of the figure, for example 220, 320, 420, 520 and 620 for the unit for treating the hydrocarbon stream containing sulfur, in FIGS. 2, 3, 4, 5 and 6, respectively.

FIG. 2 shows a unit for treating a sulfureous combustible effluent stream making it possible to perform the process that is the subject of the present invention. The unit for treating the sulfureous combustible effluent stream 220 comprises a combustion chamber 221 and a post-combustion chamber 222. A sulfureous combustible effluent stream is introduced via pipe 223 and an oxidant gas is introduced via pipe 224. A burner 228 allows the combustion reaction to be initiated. The gaseous effluent produced is withdrawn from the combustion chamber 221 and is introduced into the post-combustion chamber 222 via an orifice 225. An acidic gas is introduced into the post-combustion chamber 222 via an injection means 226. According to the embodiment shown in FIG. 2, the injection means 226 is located in the orifice 225. The combustion chamber 221 and the combustion chamber 222 are equipped with two alveolar walls, respectively 229 and 230. These alveolar walls 229 and 230 make it possible to ensure the homogenization of the gaseous streams inside the two chambers 221 and 222. The treated stream is withdrawn from the post-combustion chamber 222 via pipe 227.

In FIG. 3, the unit for treating the sulfureous combustible effluent stream 320 is also equipped with a heat exchanger 331. This exchanger 331 is installed in the continuation of the post-combustion chamber 322. According to the embodiment shown in FIG. 3, the heat exchanger 331 is a heat recovery boiler: water entering the heat exchanger 331 via pipe 332 leaves therefrom via pipe 333 at a higher temperature, generally in the form of water vapour under pressure. The effluent from the post-combustion chamber 322 leaves cooled via pipe 327. It is introduced into a condenser 335, in which the sulfur in elemental form S is condensed and recovered via pipe 337. The cooled and partially desulfurized treated stream leaves the condenser 335 via pipe 336.

Figure 4:
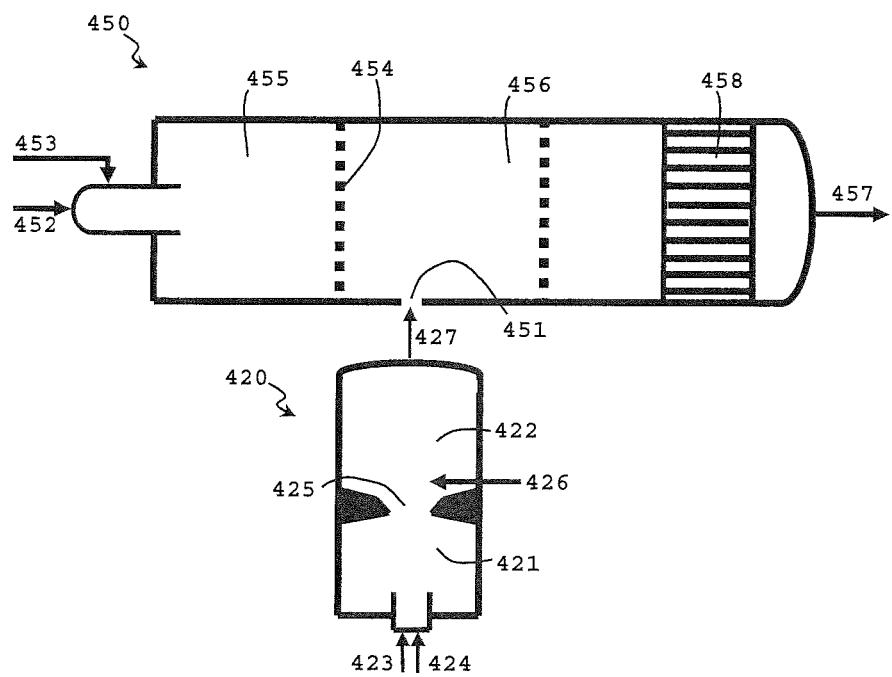
FIG. 4 represents a unit for treating a sulfureous combustible effluent stream, allowing the embodiment of the present invention to be performed, in which the treated stream withdrawn from the post-combustion chamber, optionally cooled and/or optionally partially desulfurized, is directly introduced into the reaction oven of a Claus unit, downstream of the main acidic gas burner.
Figure 5:
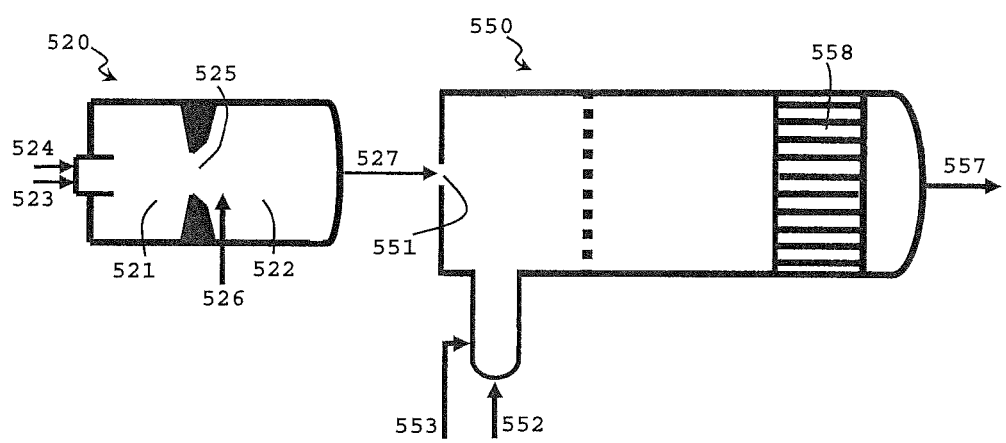
FIG. 5 represents a variant of the unit represented in FIG. 4.

FIGS. 4 and 5 represent a unit for treating sulfureous combustible effluent stream making it possible to perform the embodiment of the present invention in which the treated stream withdrawn from the post-combustion chamber, optionally cooled and/or optionally partially desulfurized, is introduced directly into the reaction oven of a Claus unit, in addition to a charge of $H_2S$-rich gas and oxidant gas.

In FIG. 4, the unit for treating the sulfureous combustible effluent stream 420 comprises a combustion chamber 421 and a post-combustion chamber 422. A sulfureous combustible effluent stream is introduced via pipe 423 and an oxidant gas is introduced via pipe 424. A burner (not shown) makes it possible to initiate the combustion reaction. The gaseous effluent produced is withdrawn from the combustion chamber 421 and is introduced into the post-combustion chamber 422 via an orifice 425. An acidic gas is introduced into the post-combustion chamber 422 via an injection means 426. The treated stream is withdrawn from the post-combustion chamber 422 via pipe 427. This treated stream is introduced into the oven of a Claus unit 450 via the orifice 451 which is located on the side wall of the oven 450. An $H_2S$-rich gas is introduced at the inlet of the oven 450, located at one end of the said oven 450, via pipe 452. An oxidant gas is also introduced at the inlet of the oven 450 via pipe 453. A burner (not shown) makes it possible to initiate the combustion reaction inside the oven 450. The oven 450 comprises an alveolar wall 454 separating the oven into two chambers 455 and 456. The alveolar wall 454 ensures homogenization of the gaseous streams. The orifice 451 is provided in the chamber 456 so that the treated stream arriving via pipe 427 mixes with the gaseous streams present in the oven 450 that are already homogenized. The gaseous streams in the chamber 455 have an $H_2S/SO_2$ mole ratio preferably equal to 2. The gaseous streams in the chamber 456 have an $H_2S/SO_2$ mole ratio preferably of between 1.9 and 2.1 and more preferably approximately equal to 2. The exit allowing the removal of the effluent from the oven 450 is located at the upstream end of the chamber 456, downstream of the alveolar wall 454. A heat exchanger 458 is installed in the continuation of the chamber 456. After having been cooled by indirect heat exchange with the exchanger 458, an effluent is withdrawn from the oven 450 via pipe 457.

In FIG. 5, the unit for treating the sulfureous combustible effluent stream 520 comprises a combustion chamber 521 and a post-combustion chamber 522. A sulfureous combustible effluent stream is introduced via pipe 523 and an oxidant gas is introduced via pipe 524. A burner (not shown) makes it possible to initiate the combustion reaction. The gaseous effluent produced is withdrawn from the combustion chamber 521 and is introduced into the post-combustion chamber 522 via an orifice 525. An acidic gas is introduced into the post-combustion chamber 522 via an injection means 526. The treated stream is withdrawn from the post-combustion chamber 522 via pipe 527. This treated stream is introduced into the oven of a Claus unit 550 via the orifice 551 located at one end of the said oven 550. Since the orifice 551 makes it possible to introduce the treated stream derived from the post-combustion chamber 526, the said treated stream is introduced into the reaction oven of a Claus unit 550 via pipe 527, located at one end of the said oven 550. The introduction of the $H_2S$-rich gas into the oven 550 via pipe 552 and the introduction of the oxidant gas into the oven 550 via pipe 553 is performed laterally relative to the oven 550. The gaseous streams inside the oven 550 have an $H_2S/SO_2$ mole ratio preferably of between 1.9 and 2.1 and more preferably approximately equal to 2. The exit for removing the effluent from the oven 550 is located at the end of the oven 550. A heat exchanger 558 is installed in the continuation of the oven 550. After having been cooled by indirect heat exchange with the exchanger 558, an effluent is withdrawn from the oven 550 via pipe 557.

The effluents collected via pipes 457 and 557 may then be treated in a Claus catalytic step.

Figure 6:
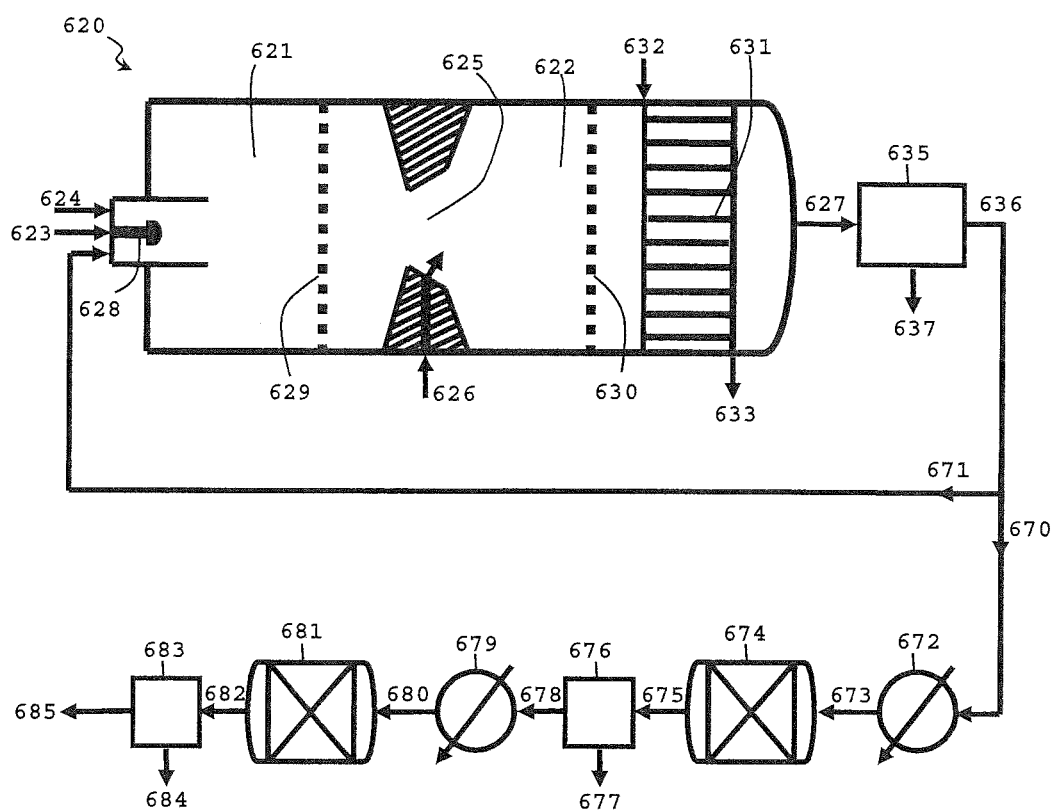
FIG. 6 represents a unit dedicated to the treatment of a sulfureous combustible effluent stream, which allows the embodiment of the present invention to be performed in which the treated stream withdrawn from the post-combustion chamber, cooled and partially desulfurized, is introduced into a series of two Claus catalytic reactors.

FIG. 6 represents a unit for treating a sulfureous combustible effluent stream making it possible to perform the embodiment of the present invention in which the treated stream withdrawn from the post-combustion chamber, cooled and partially desulfurized, is introduced into a series of two Claus catalytic reactors.

As in the embodiment shown in FIG. 3, the unit for treating the sulfureous combustible effluent stream 620 is equipped with a heat recovery boiler 631 and a condenser 635, in which the sulfur in elemental form S is condensed and is recovered via pipe 637. The cooled and partially desulfurized treated stream is recovered from the condenser 635 via pipe 636. The said stream is then divided into two parts: the first part of the stream is recycled into the combustion chamber 621 via pipe 671, and the second part of the stream is conveyed into a series of Claus catalytic reactors via pipe 670. This second part of the stream is introduced into a heat exchanger 672 and leaves via pipe 673 at an adequate temperature for the catalytic reaction which takes place in the first reactor 674. The stream is conveyed into the first catalytic reactor 674. The catalysts are typically those known to a person skilled in the art for catalysing the Claus reaction. The stream leaves the first reactor 674 via pipe 675, and is introduced into a condenser 676 in which the sulfur in elemental form S is condensed and is extracted via pipe 677. The stream leaves the condenser 676 via pipe 678 and is introduced into a heat exchanger 679. It emerges therefrom via pipe 680 at an adequate temperature for the catalytic reaction that takes place in the second reactor 681. The stream is conveyed into the second catalytic reactor 681, and them emerges therefrom via pipe 682, and is introduced into a condenser 683 in which the sulfur in elemental form S is condensed and is extracted via pipe 684. The desulfurized treated stream leaves the condenser 684 via pipe 685.

The sulfur in elemental form S, recovered via pipes 637, 677 and 684, is of a sufficient quality to be economically upgradeable. The gases discharged via pipe 685 are essentially free of sulfur. They may be burnt in a standard incinerator before being ejected into the atmosphere.

Other characteristics and advantages of the invention will emerge on reading the non-limiting and purely illustrative example that follows:

EXAMPLES

Tests for the recovery of elemental sulfur were performed by treating, in two successive steps, a sulfureous combustible effluent stream as a mixture with an oxidant gas, with a stream of acidic gas for desulfurizing a sulfureous natural gas.

The process was performed in an installation similar to that described in FIG. 6, i.e. using an oven designed according to the invention with a chamber for combusting the said stream and a post-combustion chamber with acidic gas, followed by 2 Claus catalytic steps for treatment of the oven effluents. Each step was equipped with a heat exchanger, a reactor with standard activated aluminas and a condenser.

The sulfureous combustible effluent stream to be treated was a DSO containing, on a weight basis, 6.1% of DMDS, 46.7% of DEDS, 24.1% of DPDS, 14.3% of DBDS, 2.2% of DPDS and 1.3% of DHDS. The oxidant gas used was air. The said liquid stream and the combustion air were conveyed into the burner of the combustion chamber at respective flow rates of 16.1 kmol/h and 1000.1 kmol/h and at temperatures respectively equal to 45° C. and 105° C.

The temperature in the combustion chamber 621 was about 1450° C. and the residence time of all of the gaseous effluents in the combustion chamber was about 1 second.

After total combustion of all of the gaseous effluents, the said effluents were then introduced into the post-combustion chamber, the passage of the gas into this second chamber was accompanied by the introduction of a desulfurizing acidic gas by means of injection means 626. The said acidic gas, composed of 51.7% by volume of $H_2S$ and of 43.0% of $CO_2$, was added, at 45° C., into the post-combustion chamber at a rate of 288.2 kmol/h.

The temperature in the post-combustion chamber 622 was about 1238° C. and the residence time of all of the gaseous streams in the post-combustion chamber was about 1 second.

After the post-combustion step, the gaseous stream was cooled to 300° C. in the heat recovery boiler 631 before being recovered via pipe 627, at a flow rate of 1752.2 kmol/h, and introduced into the condenser 635. Sulfur in elemental form S was then condensed at 155° C. and recovered via pipe 637. At this stage of the process, the sulfur recovery yield was 53.0%.

The gas produced, partially desulfurized and cooled to 155° C., was recovered at the outlet of pipe 636 and then divided into two parts:
- the first part, corresponding to 26% of the gas stream leaving the condenser, was recycled into the combustion chamber at a flow rate of 452.8 kmol/h,
- and the second part, corresponding to 74% of the gas stream leaving the condenser, was introduced at a flow rate of 1284.4 kmol/h into a series of two Claus catalytic stages.

After the treatment in the 2 Claus catalytic stages, the residual gases obtained at the outlet of the last condenser 683 were recovered at 135° C. at a flow rate of 1266.1 kmol/h.

After the process, the overall sulfur recovery yield was 92.6%.

The invention claimed is:

1. A process for treating a sulfureous combustible effluent stream, comprising the successive steps consisting in:
   - introducing into a combustion chamber the said stream and an oxidant gas in excess, performing the total combustion of the said stream with an excess of the oxidant gas, and withdrawing the gaseous effluent from the combustion chamber;
   - reacting, in a post-combustion chamber, a mixture consisting of the said gaseous effluent and an acidic gas, the said acidic gas being in an amount sufficient for all of the oxidant compounds to be consumed by reaction with the hydrogen sulfide of the acidic gas, the oxidant compounds being $O_2$, $SO_3$ and $NO_x$, and withdrawing the treated stream, the residence time of all of the gaseous streams in the said post-combustion chamber being at least greater than 0.5 second.

2. The process according to claim 1, characterized in that the sulfureous combustible effluent stream treated in the process according to the invention is a stream of sulfur polluted with combustible impurities.

3. The process according to claim 1, characterized in that the sulfureous combustible effluent stream treated in the process according to the invention is a DSO.

4. The process according to claim 1, characterized in that the temperature of the combustion reaction is between 1300° C. and 1500° C.

5. The process according to claim 1, the said process also comprising a step consisting in cooling the treated stream withdrawn from the post-combustion chamber.

6. The process according to claim 1, the said process also comprising a step consisting in removing the sulfur in elemental form from the treated stream withdrawn from the post-combustion chamber.

7. The process according to claim 1, the said process also comprising a step consisting in introducing the treated stream withdrawn from the post-combustion chamber, optionally cooled and/or optionally partially desulfurized, into the reaction oven of a Claus unit, in addition to a charge of acidic gas and of oxidant gas feeding the burner of the Claus reaction oven.

8. The process according to claim 1, the said process also comprising a step consisting in introducing the treated stream withdrawn from the post-combustion chamber, optionally cooled and/or optionally partially desulfurized, into one or a series of several Claus catalytic reactors.

9. The process according to claim 1, the said process also comprising an additional step consisting in recycling into the combustion chamber at least part of a process stream substantially not containing any oxygen, the temperature of which is less than 300° C.

10. The process according to claim 9, characterized in that the stream at least partly recycled into the combustion chamber is the partially desulfurized, cooled treated stream, obtained after a cooling step and a step of condensation of the sulfur formed in the post-combustion stage.

\* \* \* \* \*